March 22, 1960  H. E. KENNEDY  2,929,910
POWDER ENTRAINED GAS SHIELDED METAL ARC WELDING
Filed June 7, 1957  2 Sheets-Sheet 1
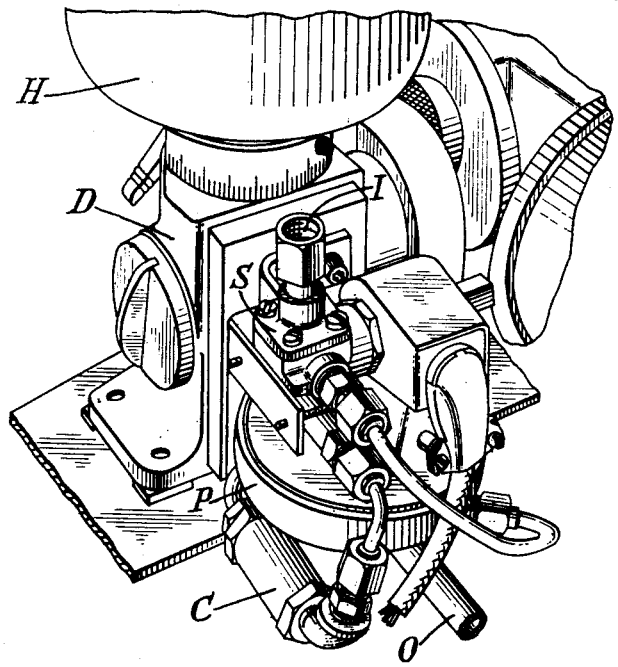
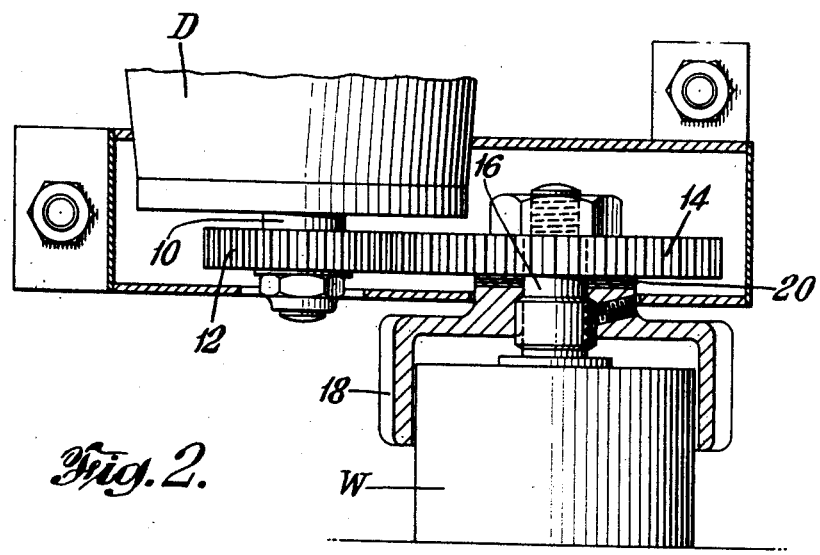
INVENTOR
HARRY E. KENNEDY
BY
Richard S. Shreve
ATTORNEY

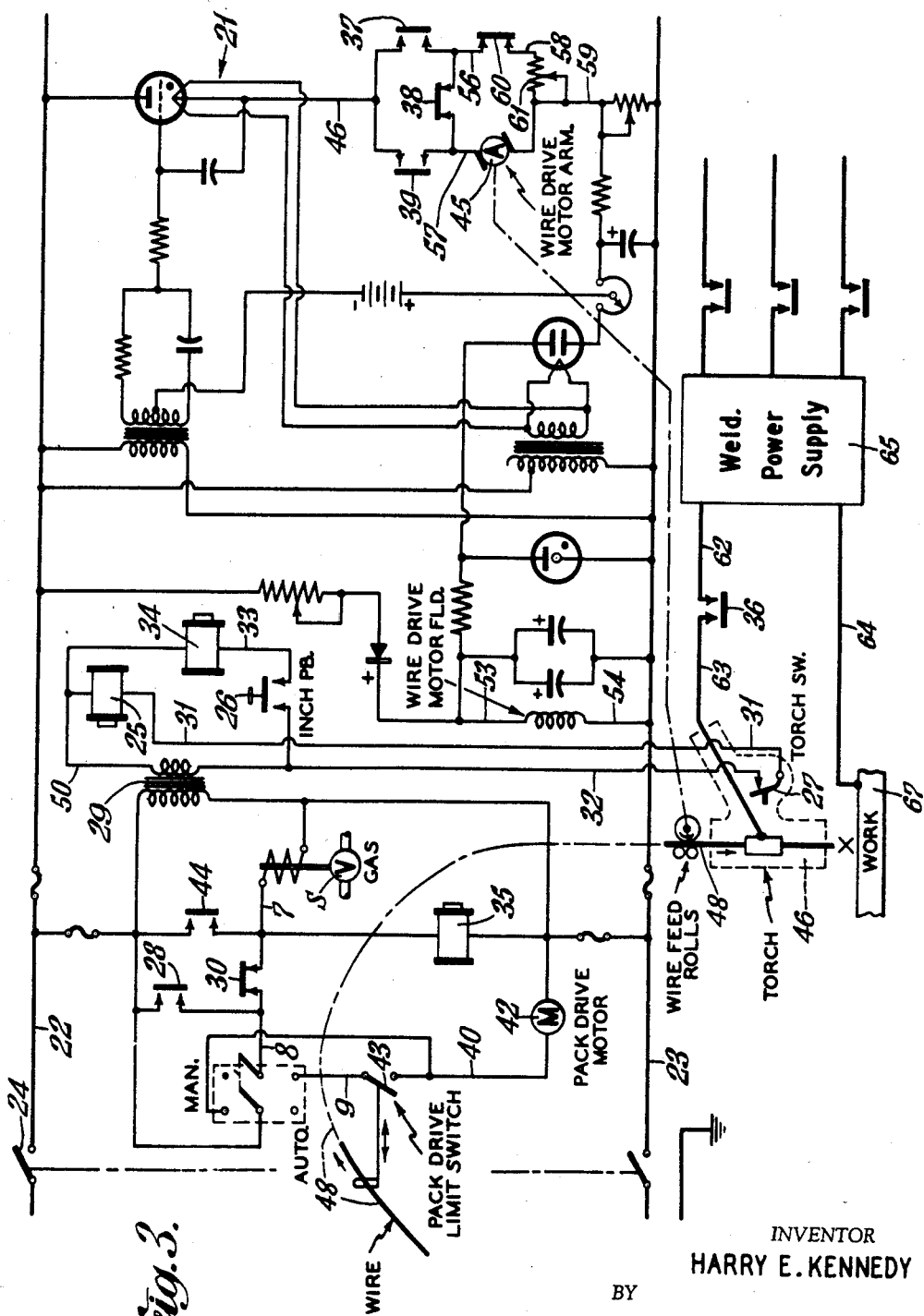

United States Patent Office 2,929,910
Patented Mar. 22, 1960

2,929,910

POWDER ENTRAINED GAS SHIELDED METAL ARC WELDING

Harry E. Kennedy, Berkeley, Calif., assignor to Union Carbide Corporation, a corporation of New York Application June 7, 1957, Serial No. 664,256

6 Claims. (Cl. 219—74)

This invention relates to powder entrained gas shielded metal arc welding, and more particularly to process and apparatus in which the shielding gas conveys a quantity of powdered magnetic flux, which may be either gas evolving or non-gas evolving, into the arc area while a consumable electrode is fed into the weld at a controlled rate.

The magnetic flux is attracted by the magnetic field around the wire and adheres to the wire all or in part. As the wire is directed into the weld puddle, this welding composition acts to flux and refine the puddle and shields the molten metal from atmospheric contamination.

The principal advantage of this new process is that the welding costs can be reduced as much as 50 percent in many cases. The new process is applicable over a much wider range of actual production conditions than is possible with prior processes using a continuously fed electrode. The use of a relatively inexpensive shielding gas, coupled with a high metal deposition rate, and low consumption of gas and flux all contribute to make a low cost process.

This application is in part a continuation of my copending applications Serial No. 481,906, filed January 14, 1955, for the basic process, now abandoned, and superseded by copending continuation-in-part application Serial No. 662,139, filed May 28, 1957; Serial No. 481,855, filed January 14, 1955, for the feeding control, now Patent No. 2,788,463 dated April 9, 1957; Serial No. 488,820, filed February 17, 1955, for the magnetic powder dispenser, now abandoned, and superseded by copending continuation application Serial No. 634,584, filed January 16, 1957; and Serial No. 606,648, filed August 28, 1956, for the basic torch. Improved phases are the subject of applications, Wojciak et al. Serial No. 606,686, filed August 28, 1956, on the torch, now Patent No. 2,876,334, dated March 3, 1959; Acomb et al. Serial No. 607,421, filed August 31, 1956, on the dispenser, now Patent No. 2,878,075, dated March 17, 1959; Miller et al. Serial No. 607,428, filed August 31, 1956, on the welding wire feed, and Acomb Serial No. 607,656, filed September 4, 1956, on the pinch valve. By these references the entire disclosures of these applications are hereby incorporated into this application.

The torch is used for gas-shielded metal-arc welding in which a consumable wire electrode is fed through a guide tube in the torch, and the welding gas passes through a gas-directing nozzle. Welding power, gas, and flux services are housed within the torch handle; these service lines are bound together in a gum-rubber sheath for protection and flexibility. Bare consumable welding wire is fed to the torch through a flexible conduit attached to the rear of the torch body. The flux is entrained in the carrier-gas stream usually welding-grade carbon dioxide at the flux dispenser and is carried to the torch through a plastic powder-hose assembly.

The principal function of the torch is to introduce powdered or granulated welding flux, conveyed by a shielding gas, to the weld zone. The gas-borne magnetic flux must be uniformly distributed and insulated from the current-carrying guide tube. Welding power is supplied in the usual manner.

The powder-gas stream is directed through a grooved insulator collet body in the torch to the four orifices in the nozzle. This insulator collet body also isolates the effect of the magnetic field around the wire so that the flux is attracted only to the wire in the nozzle near the point of use and not to other torch parts along the flow path. A soft rubber sleeve on the back of the insulator collet body protects the collet body from abrasion where the flux enters the torch body.

The process preferably employs a silica free welding flux as disclosed in Claussen application Serial No. 569,382, filed March 5, 1956. This flux consists essentially of a slag modifier, an arc stabilizer, a magnetic component, and is contains no compound which will evolve a gas during the welding operation. However the fluxes are not limited to the non-gas evolving type, since satisfactory results were obtained using gas evolving fluxes on medium carbon steels, and on low and high alloy steels.

Magnetic and non-magnetic components may be combined in one flux. The magnetic component adheres to the wire and the non-magnetic component is blown into the weld puddle via the carrier gas. Thus a modification of the process consists of introducing the flux to the weld zone so that part of the gas-borne flux magnetically adheres to the welding wire, while the remainder is borne by the shielding gas to the weld zone.

This duplex method is of particular value when small diameter wires and/or low welding currents are used. Also this method can be further modified by the use of a flux which consists of a mixture of magnetic and non-magnetic components. In such case, the non-magnetic component is gas borne only, while the magnetic component adheres to the wire.

Carrier gases for the process include carbon dioxide, argon, sigma grade argon, and helium for carbon steel. For stainless steel nitrogen and air are satisfactory carriers for the flux along with the gases listed. If carbon dioxide other than welding grade is used, a drier must be added in the gas conveying system to remove moisture and to ensure good weld impact properties. Silica gel in copper tubing is suitable to dry the gas.

The flux dispenser is a flux-storage and metering device. With it the required amount of flux can be discharged into the stream of carrier gas at a controlled rate to obtain optimum welding conditions. The dispenser consists of a hopper body, a removable cover, a filter screen, and an internal pressure tube. Under operating conditions, the hopper body assembly is pressurized by carbon dioxide gas at about 4 p.s.i. supplied through the pressure tube. The hopper assembly can be screwed in or out of the body of the powder dispenser to control the quantity of flux released into the gas stream. When the hopper is screwed down, the flux orifice is brought closer to the magnetic drum and less flux is delivered. When the hopper is backed up from the powder dispenser body, more flux can flow from the dispenser. A locking screw assembly holds the hopper at the selected setting. A calibrated ring on the hopper indicates the position of the flux orifice and enables rapid adjustment of the flux flow rate to the desired setting.

A magnetic drum mounted on a drive shaft is positioned directly beneath the nozzle of the hopper assembly. The magnetic flux passes down from the hopper assembly and adheres as a layer to the surface of the rotating magnetic drum. As the drum rotates, a rubber scraper positioned beneath it removes the flux layer from the drum and allows it to fall under gravity into the distribution chamber. Here the flux is suspended in the gas stream and is conveyed to the torch. The drive shaft for the magnetic drum is linked through a clutch and a set of gears to the gear reduction shaft of the welding head.

In the drawings:

Figure 1 is a perspective view of the welding machine, showing the hopper, powder dispenser, and the valves for controlling the powder-gas operation;

Figure 2 is a horizontal section through the welding head and powder dispenser, showing the common drive power transmission; and Figure 3 is a wiring diagram for controlling the operation of the machine and process.

As shown in the drawing, the machine comprises a hopper H mounted on a powder dispenser D, as disclosed in my copending application Serial No. 488,820 and the copending application of Acomb et al. Serial No. 607,421, and contains a magnetic drum or conveyor with which the required amount of flux can be discharged into the stream of carrier gas at a controlled rate to obtain optimum welding conditions.

A four-way solenoid valve S, a check valve C and a powder pinch valve P comprise the powder dispenser control elements of the powder gas conveying system, as disclosed in the copending Acomb application Serial No. 607,656. The gas solenoid valve is electrically controlled through the two button torch switch. When the torch switch is closed, the solenoid valve operates to allow gas to flow from the inlet I through the solenoid valve S and check valve C to the distributed chamber where powder is entrained; then the gas-borne flux passes through the pinch valve P to the powder outlet connection O and the torch powder hose. At this time the hopper body is pressurized through the pressure tube from the distributor chamber. During this cycle the chamber of the pinch valve is vented to the atmosphere so that the powder flow is unobstructed.

When the torch switch is opened, the upstream side of the check valve is vented to the atmosphere to allow the solenoid valve and check valves to operate. The gas pressure from the cylinder is thereby diverted to the diaphragm of the powder pinch valve assembly closing off the powder to the torch, while the downstream side of the check valve closes to retain the pressure within the hopper body. Pressure is maintained within the hopper body even if the welding operation is halted, due to the combined actions of both the powder pinch and check valves.

As shown in Fig. 2, the shaft 10 for the magnetic conveyor in the dispenser D has pinned thereto a spur gear 12 meshing with a spur gear 14 rotatably mounted on the shaft 16 of a welding head W shown in the copending application of Rath et al. Serial No. 583,870, filed May 9, 1956. A clutch 18 is screwed onto the feed roll drive shaft 16, to force a friction washer 20 into driving engagement with the spur gear 14. Thus the powder dispensing conveyor is driven by a mechanical power transmission from the shaft which drives the feed rolls for the electrode wire. An alternate chain and sprocket drive is shown in the Miller et al. application Serial No. 607,428, filed August 31, 1956.

As shown in Fig. 3, an electronic governor 21 is connected to a 115 volt 60 cycle power supply by means of leads 22 and 23 provided with a switch 24. The primary winding of an inching transformer 29 is also connected to the power supply by means of leads 22 and 23. The secondary winding of inching transformer 29 is connected to an inching relay 34 and weld start relay 25 by means of lead 50 inching push button 26 and lead 33 to inching relay 34, and lead 32 to torch switch 27, lead 31 to weld start relay 25.

A circuit is provided for the coil drive motor 42 from lead 22 to inching relay contact 28 to lead 8 to coil switch 30 through lead 9 to coil limit switch 43 to lead 40 to the coil drive motor 42 through lead 23 to the other side of the 115 volt circuit.

A circuit is provided for the gas solenoid valve S and welding contactor 35 from lead 22 through weld start relay contact 44, through lead 7 to gas solenoid valve S and welding contactor 35 back through lead 23 to the other side of the 115 volts supplied.

The wire drive motor 45 is connected to the electronic governor 21 by means of leads 53 and 54 which supply the field voltage for wire drive motor 45. Lead 46 connects electronic governor 21 to weld start relay contact 39 and inching relay contacts 37. Lead 56 connects weld start relay contact 38 and inching relay contact 37 to inching relay contact 60. Lead 57 connects weld start relay contact 39 and 38 to one side of the wire drive motor armature of the wire drive motor 45. Lead 58 connects inching relay contact 60 to resistor 61. Lead 59 connects electronic governor 21 to resistor 61 and wire drive motor armature of the wire drive motor 45.

The D.C. welding power supply 65 is connected to the torch 46 by means of lead 62 through welding contactor contact 36 and lead 63 to the wire guide tube in torch 46. A lead is connected from the welding power supply 65 by means of lead 64 to the workpiece 67.

Assuming that switch 24 is closed and D.C. welding power supply 65 is energized, the following occurs when welding is desired. Closing torch switch 27 energizes weld start relay 25 by means of the circuit from the secondary of transformer 29, through lead 32 to torch switch 27, through lead 31, through weld start relay 25 through lead 50, back to secondary winding of transformer 29. When weld start relay 25 becomes energized weld start relay contact 44 closes and energizes gas solenoid valve S, welding contactor 35, and also energizes the circuit for the coil drive motor 42.

When weld start relay 25 is energized, weld start relay contact 39 closes and contact 38 opens. When weld start relay contact 39 closes, a circuit is provided to the armature of wire drive motor 45 through lead 46 from electronic governor 21 through weld start relay contact 39, through lead 57, through armature of wire drive motor 45, through lead 59 back to electronic governor 21. This causes armature of wire drive motor 45 to rotate which then drives wire 48 through the guide tube in torch 46 to the workpiece 67. Welding power from the D.C. power supply 65 flows through lead 62, through welding contactor contact 36, through lead 63, through the guide tube in torch 46 to the workpiece 67 back through lead 64 to the power supply 65.

When the wire 48 actuates coil drive limit switch 43, a circuit is provided to the coil drive motor 42 as follows: from lead 22 through weld start relay contact 44 to lead 7 through inching relay contact 28, through lead 8, through coil drive switch 30 through lead 9, coil drive limit switch 43, through lead 40 through coil drive motor 42 back through lead 22. When coil drive motor 42 is energized, it rotates the coil drum.

When torch switch 27 is released, the weld start relay 25, the welding contactor 35, and gas solenoid valve S become de-energized and thereby extinguish the arc between torch 46 and work 47. Weld start relay 25 de-energizes, weld start relay contact 39 opens, and weld start relay contact 38 closes which provides a circuit from the armature of wire drive motor 45, through lead 57, through weld start relay contact 38, through lead 56 through inching relay contact 60, through lead 58, through resistor 61, through lead 59 to armature of the wire drive motor, and thereby stops the armature of wire drive motor 45 abruptly.

When the armature of the wire drive motor 45 rotates and feeds wire 48, a pulley is also rotated which connects to another pulley by means of a belt to the magnetic drum located in the powder dispenser. This causes powder to flow while the wire is feeding.

When the torch switch is opened, the upstream side of the check valve is vented to the atmosphere to allow the solenoid valve and check valves to operate. The gas pressure from the cylinder is thereby diverted to the diaphragm of the powder pinch valve assembly closing off the powder to the torch, while the downstream side of the check valve closes to retain the pressure within the hopper body. Pressure is maintained within the hopper body even if the welding operation is halted, due to the the combined actions of both the powder pinch and check valves.

What is claimed is:

1. Method of powder entrained gas shielded metal arc welding in which an arc is struck between a wire electrode connected to a source of power and a workpiece connected to said source, which comprises feeding said wire toward said workpiece at a rate commensurate with the burn off rate of said wire, simultaneously metering and conveying said powder from a supply thereof at a rate proportional to the rate of feed of said wire, aspirating said metered and conveyed powder into a stream of shielding gas to entrain the same therein, passing said gas-borne powder in a stream down along and outside of said wire, and deflecting the powder inward toward the wire to adhere at least in part to the moving wire and be carried along thereby while the carrier gas passes on to shield the arc and weld puddle.

2. Method of gas borne powder distribution which comprises charging the powder into a hopper, passing a stream of compressed gas from a supply to said hopper to pressurize the powder therein, metering the pressurized powder, injecting another stream of compressed gas from the same supply into aspirating relation with said metered powder to entrain the same therein, passing said gas-borne powder stream through a diaphragm operated pinch valve to a gas directing nozzle, and diverting said injected stream from said aspirating relation to the diaphragm of said pinch valve to cut off the flow of said gas-borne powder while maintaining the pressurized condition of the powder in said hopper.

3. Method of powder entrained gas shielded metal arc welding in which an arc is struck between a wire electrode connected to a source of power and a workpiece connected to said source, which comprises feeding said wire toward said workpiece at a rate commensurate with the burn-off rate of said wire, charging the powder into a hopper, passing a stream of compressed gas from a supply to said hopper to pressurize the powder therein, simultaneously metering and conveying said powder at a rate proportional to the rate of feed of said wire, injecting another stream of compressed gas from the same supply into aspirating relation with said metered powder to entrain the same therein, passing said gas-borne powder stream through a diaphragm-operated pinch valve to a gas directing nozzle through which said wire passes toward the workpiece, and diverting said injected stream from said aspirating relation to the diaphragm of said pinch valve to cut off the flow of said gas-borne powder while maintaining the pressurized condition of the powder in said hopper.

4. Apparatus for powder entrained gas shielded metal arc welding in which an arc is struck between a wire electrode connected to a source of power and a workpiece connected to said source, which comprises means for feeding said wire toward said workpiece at a rate commensurate with the burn off rate of said wire, means for simultaneously metering and conveying said powder from a supply thereof at a rate proportional to the rate of feed of said wire, means for aspirating said metered and conveyed powder into a stream of shielding gas to entrain the same therein, means for passing said gas borne powder in a stream down along and outside of said wire, and means for deflecting the powder inward toward the wire to adhere at least in part to the moving wire and be carried along thereby while the carrier gas passes on to shield the arc and the weld puddle.

5. Apparatus for gas borne powder distribution which comprises means for charging the powder into a hopper, means for passing a stream of compressed gas from a supply to said hopper to pressurize the powder therein, means for metering the pressurized powder, means for injecting another stream of compressed gas from the same supply into aspirating relation with said metered powder to entrain the same therein, means for passing said gas borne powder stream through a diaphragm-operated pinch valve to a gas directing nozzle, and means for diverting said injected stream from said aspirating relation to the diaphragm of said pinch valve to cut off the flow of said gas borne powder while maintaining the pressurized condition of the powder in said hopper.

6. Apparatus for powder entrained gas shielded metal arc welding in which an arc is struck between a wire electrode connected to a source of power and a workpiece connected to said source, which comprises means for feeding said wire toward said workpiece at a rate commensurate with the burn-off rate of said wire, means for charging the powder into a hopper, means for passing a stream of compressed gas from a supply to said hopper to pressurize the powder therein, means for simultaneously metering and conveying said powder at a rate proportional to the rate of feed of said wire, means for injecting another stream of compressed gas from the same supply into aspirating relation with said metered powder to entrain the same therein, means for passing said gas borne powder stream through a diaphragm-operated pinch valve to a gas directing nozzle through which said wire passes toward the workpiece, and means for diverting said injected stream from said aspirating relation to the diaphragm of said pinch valve to cut off the flow of said gas-borne powder while maintaining the pressurized condition of the powder in said hopper.

References Cited in the file of this patent

UNITED STATES PATENTS

| | | |
|---|---|---|
| 2,549,033 | Tyrner | Apr. 17, 1951 |
| 2,727,125 | Muller | Dec. 13, 1955 |
| 2,767,302 | Brashear | Oct. 16, 1956 |
| 2,820,137 | Ghemar et al. | Jan. 14, 1958 |

FOREIGN PATENTS

| | | |
|---|---|---|
| 394,773 | Great Britain | July 6, 1933 |
| 472,363 | Great Britain | Sept. 22, 1937 |
| 608,270 | Great Britain | Sept. 13, 1948 |